Feb. 6, 1973  S. R. FREELAND  3,715,149

CONVERTIBLE SUNSHADE AND LENS CAP

Filed April 16, 1971

Inventor:
Stanley R. Freeland
William F. [Pinck]
By John E. Peele Jr. Attys

United States Patent Office 3,715,149
Patented Feb. 6, 1973

3,715,149
CONVERTIBLE SUNSHADE AND LENS CAP
Stanley R. Freeland, Glenview, Ill., assignor to
Bell & Howell Company, Chicago, Ill.
Filed Apr. 16, 1971, Ser. No. 134,795
Int. Cl. G02b *23/16;* G03b *11/04*
U.S. Cl. 350—58      2 Claims

ABSTRACT OF THE DISCLOSURE

A convertible sunshade and lens cap device adapted for protecting a lens in a lens mount of an optical instrument respectively from light rays of extreme angles during use and from dust during storage. The device comprises a tubular sunshade adjustable to cause hinged, preferably integral, flap portions to pivot between open and closed orientations

---

This invention relates to a device for protecting the lens of a camera from glare while pictures are being taken, and from dust when the camera is not being used, and is particularly concerned with a single structure that may be secured to the lens mount of a camera and may perform both of these functions by means of a simple adjustment without the addition or removal of any separable parts.

The separate use of sunshades and lens caps for respectively protecting the lens of a camera from glare while pictures are being taken, and for protecting it from dust when the camera is not being used, has been common practice for many years. Such separate use of these devices has always had several inherent disadvantages in that the separate fabrication of the parts adds to the expense of the camera equipment, and the necessity of removing the lens cap from the lens mount requires time that may sometimes cause the photographer to miss the opportunity to take pictures of unexpected happenings. Additionally, there is always the possibility that the separable lens cap and sunshade may be misplaced or lost when removed from the camera.

In accordance with the present invention, the combination sunshade and lens cap is threaded on the lens mount and secured thereto in such a manner that it cannot be accidentally displaced. The sunshade has a plurality of integral lips extending inwardly from the inner wall surface of the sunshade intermediate its length. Each lip is sector shaped, and the total surface of all the lips is equal to the cross sectional area of the sunshade taken in the plane of the lips when they are in their closed position transversely of the opening of the sunshade. Each lip has an integral reinforcing rib extending longitudinally along its inner surface from or near its apex. The other end of each rib is spaced from the base of the sector to provide an integral flexible hinge for the lip, and to provide a bearing or push point for pressing the lip to an open position. When the sunshade is in its outwardly extended position, the lips assume their normal closed position, in which they form a lens cap completely covering the lens opening of the camera. As the sunshade is screwed inwardly toward the camera, the outer end of the lens mount engages the inner ends of the reinforcing ribs to move the lips toward their fully open position in which each lip lies against the inner wall surface of the sunshade. The axial movement of the sunshade may be stopped anywhere between its fully extended position and its retracted position, and the shade will remain in the position to which it has been moved until moved again. In any intermediate position of the sunshade, the lips are partially closed, and special effects may be attained by taking pictures with the lips of the sunshade in various intermediate positions.

Suitable structure by means of which the above-mentioned and other advantages of the invention are attained will be fully described in the following specification, taken in conjunction with the accompanying drawings showing a preferred embodiment of the invention.

Figure 1:
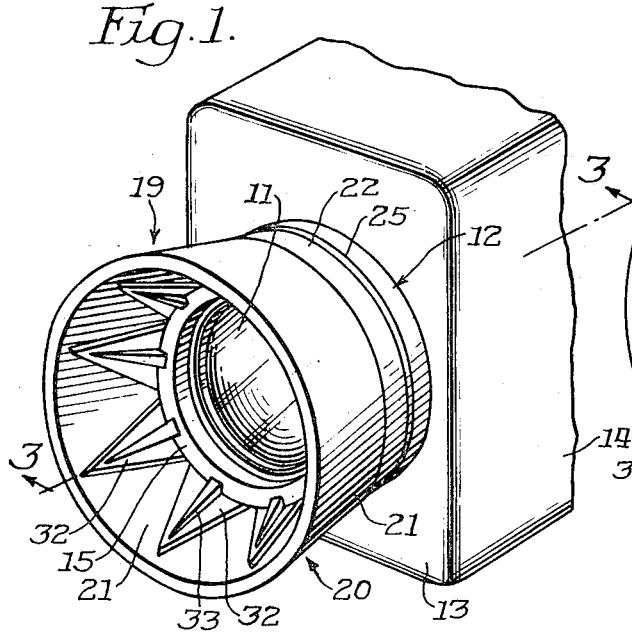
FIG. 1 is a perspective view of a combination sunshade and lens cap applied to the lens mount of a camera, with the components of the lens cap in fully open position.
Figure 2:
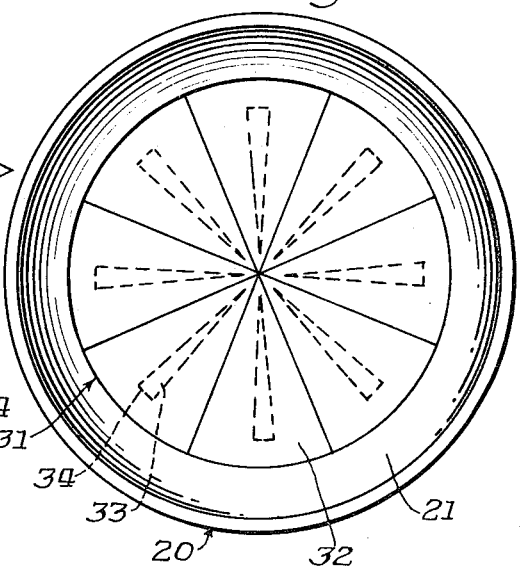
FIG. 2 is a front elevational view of the combination sunshade and lens cap, with the lens cap in closed position.
Figure 3:
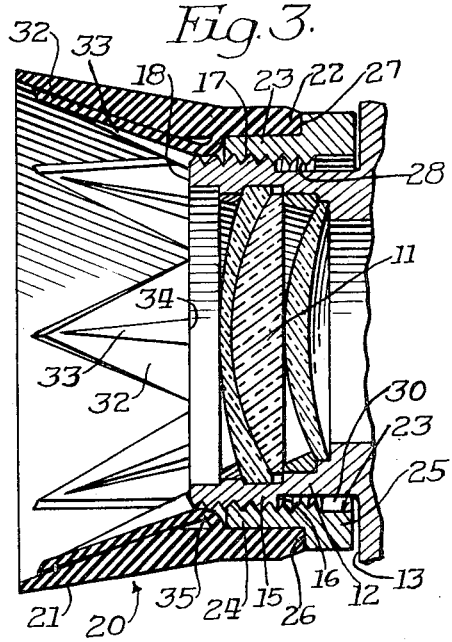
FIG. 3 is a cross sectional view taken in the plane indicated by the line 3—3 of FIG. 1.
Figure 4:
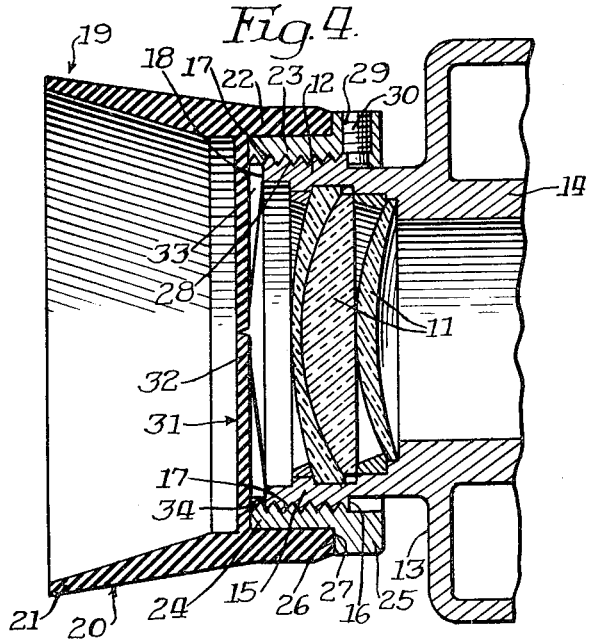
FIG. 4 is a cross sectional view with the lens cap in closed position.
Figure 5:
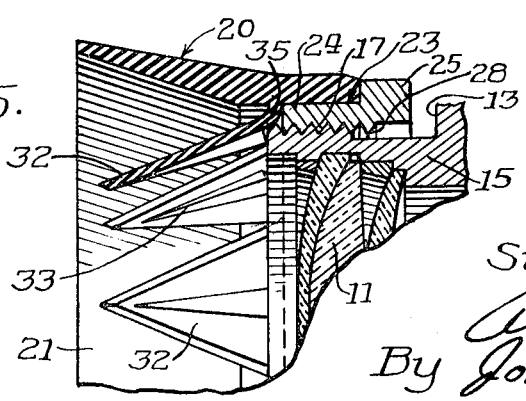
FIG. 5 is a fragmentary cross sectional view with the lens cap partially open.

Referring to the drawings, one or more lens elements 11 are fixed in a tubular lens mount 12 projecting forwardly from the front wall 13 of an optical instrument, shown as camera 14. The lens mount has an outer end portion 15 of enlarged outside diameter terminating in an external annular shoulder 16 spaced forwardly of front wall 13. The outer end portion 15 of the mount is provided with an external thread 17 extending from the front end 18 of the lens mount to the shoulder 16.

The sunshade 19 comprises a tubular member 20 having a frusto-conical portion 21 merging at its smaller end into a cylindrical portion 22. A sleeve 23 has one end portion 24 permanently secured within the cylindrical portion 22, and has an enlarged rim 25 providing an external annular shoulder 26 abutting the end 27 of the cylindrical portion 22. The inner wall surface of the sleeve 23 is provided with threads 28 for interengaging the threads 17 of the lens mount. The rim 25 has a threaded recess 29 extending transversely through its wall. A set screw 30 is threaded into the recess. After the sunshade 19 is positioned on the lens mount, the set screw 30 is threaded through the recess 29 to project into the annular space between shoulder 16 and front wall 13. As the sunshade is axially moved outwardly relative to the lens mount along the long lead threads 17, 28, the projecting end of set screw 30 engages the shoulder 16 to limit the movement and prevent accidental separation of the sunshade from the lens mount.

The lens cap 31 comprises a plurality of sector shaped lips or flap portions 32 molded integrally with the body of the sunshade and which extend from the inner wall surface of the cylindrical portion 22 transversely of the sunshade in a plane spaced a short distance from the smaller end of the frusto-conical portion 21. Each lip 32 is so dimensioned that in the closed or normal position, each of the straight edges of each lip abuts the straight edge of the adjacent lip to form a dust seal. The total cross sectional area of all the lips or flap portions equals the cross sectional area of the interior of cylindrical portion 22 of the sunshade so that in the closed position, the lips cooperate to completely block the interior of the cylindrical portion 22 of the sunshade and thereby form a lens cap which effectively protects lens 11 against dust.

The sunshade and lens cap are molded as an integral unit from any suitable plastic or rubber material. The wall of cylindrical portion 22 of the sunshade is of sufficient thickness to provide substantial rigidity for the sunshade. The lips 32 are thinner than the wall of the cylindrical portion 22 and are flexible. A wedge shaped reinforcing rib 33 integral with each lip 32 is formed on the surface of the lip remote from the frusto-conical portion of the sunshade and extends from the apex of the lip toward the center of its arcuate base. Each rib increases in height from the apex of the lip toward the base of the lip, and the higher end 32 of each rib is spaced from the base a distance slightly greater than the wall thickness of the threaded end portion 24 of sleeve 23 to insure a flexible hinge portion 35 for each lip adjacent the inner wall surface of the cylindrical portion of the sunshade. The threaded end of the sleeve 23 abuts each lip 32 between the end 34 of its rib and the inner wall surface of the cylindrical portion of the sunshade, and cooperates with the rib to prevent movement of any lip from its closed position into the open front end of the lens mount.

In the closed position of the lens cap, the circular wall defining the front end of the lens mount 12 is axially aligned with the ends 34 of the ribs 33. The threaded interengagement of the lens mount and the sleeve 23, which is permanently fixed in the end of the tubular cylindrical portion of the sunshade, permits the sunshade to be moved axially toward and away from the front wall of the camera by rotating the sunshade relative to the lens mount. When the sunshade is rotated to move it toward the front wall of the camera, the ends 34 of the ribs are pressed against the circular wall 18 defining the front end of lens mount 12, and the lips 32 are forced toward their open position. The lips may be held in fully open position, or in any partially open position, by stopping rotation of the sunshade when the lips are in the desired position. If the sunshade is rotated as far as it will go, the lips will be in fully opened position. When the sunshade is rotated in the opposite direction, it moves axially outwardly from the front wall of the camera, and the pressure against the lips is relieved. The resilience of flexible hinge portion 35 of each lip causes the lips to move toward their closed position as the pressure against them is relieved. When the set screw 30 engages the shoulder 16 to stop outward movement of the sunshade, lips or flap portions are clear of end 18 of lens mount 12 and reach their fully closed position.

Although I have described a preferred embodiment of the invention in considerable detail, it will be understood that the description thereof is intended to be illustrative, and many of the details may be modified or changed without departing from the spirit or scope of the invention.

What is claimed is:

1. A combination sunshade and lens cap device for protecting a lens in a lens mount projecting forwardly from the front wall of a camera, the device comprising:

a tubular member consisting of a frusto-conical portion merging into a cylindrical portion threaded on the front end of the lens mount;

a plurality of sector shaped lip portions integral with said tubular member and, in their closed positions, extending inwardly from the inner wall surface of said cylindrical portion in a transversely extending common plane adjacent the front end of said lens mount to substantially block the interior cross-section area of said cylindrical portion, each of said lip portions having a wedge shaped reinforcing rib extending from the apex of said sector toward the base of said sector, each of said ribs projecting from the surface of a lip portion adjacent the front end of said lens mount, the highest end of each rib being axially aligned with a circular wall defining the front end of said lens mount and being spaced from the inner wall surface of said cylindrical portion to cooperate with said circular wall upon axial adjustment of said device to cause movement of said lip portions between open and closed orientation; and a flexible hinge portion of each of said lip portions being contiguous to said inner wall surface to enable movement of said lip portions selectively from said closed positions toward a full open position relative to the front end of said lens and relative to the front wall of the camera.

2. A combination sunshade and lens cap device as recited in claim 1, including threaded coupling means attaching said body member to said lens mount to provide said axial adjustment.

References Cited

UNITED STATES PATENTS

| 178,391 | 6/1876 | Wale | 350—266 X |
| 3,390,931 | 7/1968 | Luning et al. | 350—57 |

FOREIGN PATENTS

| 910,142 | 4/1954 | Germany | 350—58 |

DAVID H. RUBIN, Primary Examiner

U.S. Cl. X.R.

95—11; 350—65